March 3, 1970 — F. A. PALL — 3,498,706
ADDITIVE COLOR PROJECTION
Filed May 4, 1966 — 2 Sheets-Sheet 1
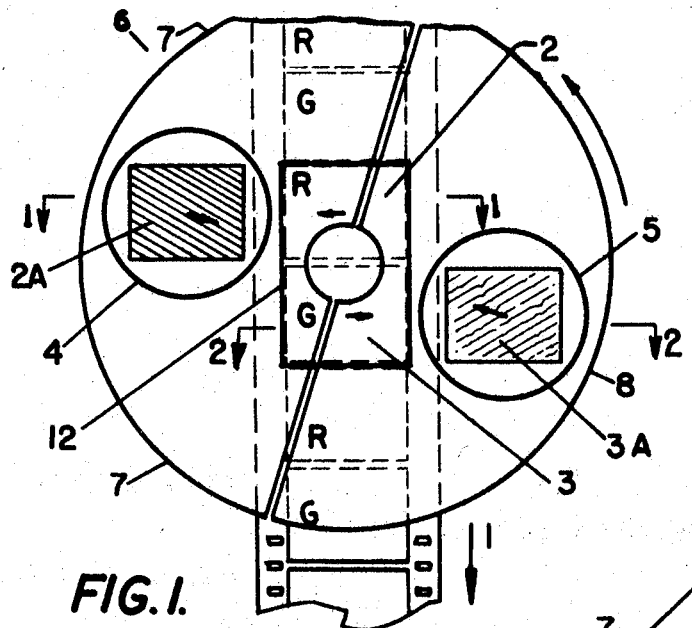
FIG. I.
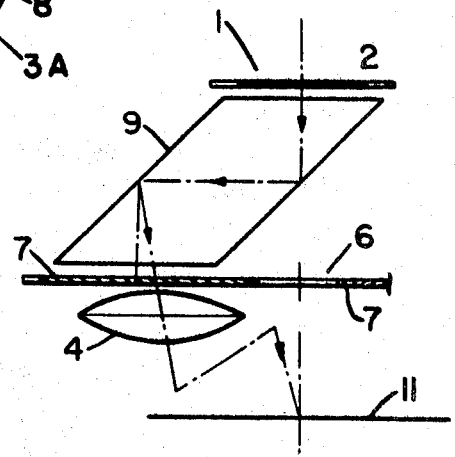
FIG. 3
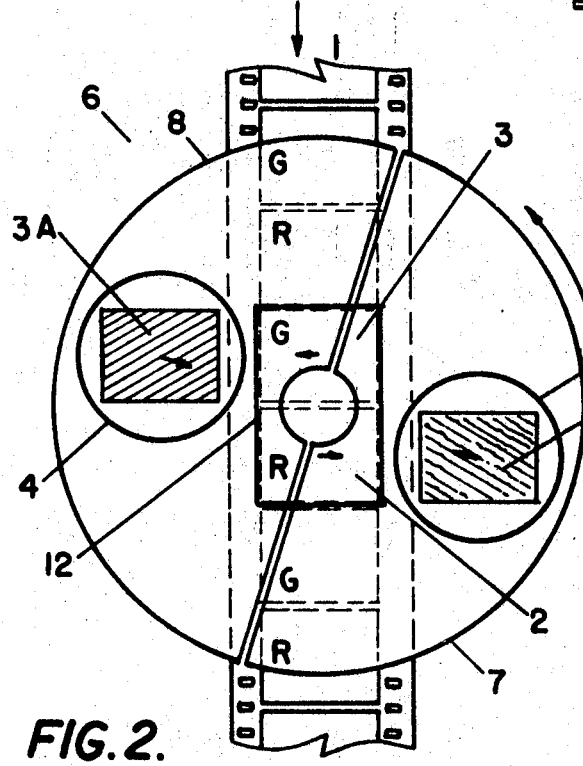
FIG. 2.
FRANCIS A. PALL
INVENTOR March 3, 1970        F. A. PALL        3,498,706

ADDITIVE COLOR PROJECTION

Filed May 4, 1966        2 Sheets-Sheet 2

FRANCIS A. PALL
*INVENTOR.*

United States Patent Office 3,498,706
Patented Mar. 3, 1970

3,498,706
ADDITIVE COLOR PROJECTION
Francis A. Pall, La Jolla, Calif.
(2239 E. Cochran St., Simi Valley, Calif. 93065)
Filed May 4, 1966, Ser. No. 548,354
Int. Cl. G03b 21/00
U.S. Cl. 353—31   1 Claim

ABSTRACT OF THE DISCLOSURE

In an additive color projection, the standard size adjacent multiple color separation frames are simultaneously projected with conventional frequency. The appropriate color lights of each frame are synchronzed with the corresponding color separation images, and channeled through individual lenses into one composite color picture on the screen. With a single frame advancement of the film per projection frequency, each image is repeatedly projected from different positions, as many times, as many colors are used in the projection. To diminish the color fringes—due to the time lag between the consecutively exposed images—only one lens projects sharp image, while the other(s) contribute diffused, fill in color(s) only.

---

Figure 4:
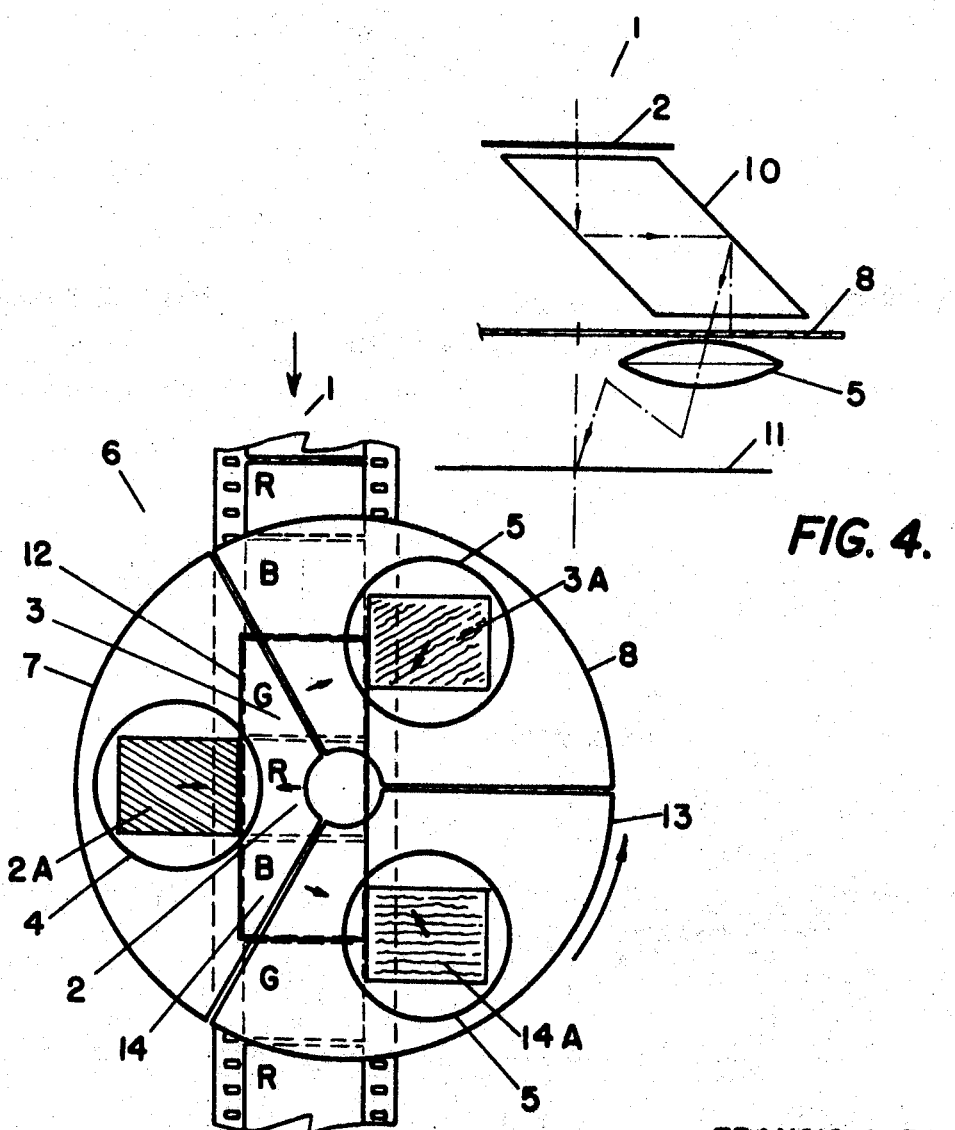

The present invention relates to improvements in color photography and projection. It is particularly an improvement in the system of additive color projection to that described in the specification in my application, now Patent 2,733,632, according to which system three adjacent frames are projected simultaneously through a single lens and the light beams of the images of the adjacent frames are bent, each through an optical wedge to the extent that they superimpose the center projected image.

Probably the most difficult problem was in the additive color projection, to provide sufficient space for the lens or the lens segments, capable of transmitting enough light for acceptable illumination of the screen. The proposal to reduce the film image size created more problems and was abandoned. My proposal of using a single lens and optical wedges for the purpose of aligning the adjacent images into register, also fell short of general acceptance. Other limitations and disadvantages of the proposal are well known to those skilled in the art and need not to be set forth in detail.

My invention contemplates the elimination of the disadvantages and limitations above referred to by the utilization of the full size standard frames for additive color projection and an individual conventional size projector lens for each frame in simultaneous projection, without the increase of the frequency or changing the single frame pull down. The device is usable for two or three color projection, in still or motion pictures projection, for viewing or for making color prints. The device uses a standard or conventional projector design with a slight modification, merely by opening the film gate to eliminate multiple frames and interposing an image channel to displace the axis of the lights passing through each transparency to accommodate one conventional size projector lens for each frame and interposing the corresponding color filters.

The object of this invention is to provide a satisfactory practical solution in additive color projections.

Another object is to make the transition economical, by retaining as much as possible of the existing conventional equipment and without the necessity to design intricate trick lenses and optical components.

Still another object is to make possible the use of the heat developable film for the release production of color features, thereby conserving the precious silver, otherwise lost in the process of developing.

In the following description, no distinction will be made between pictures composed of two or three colors. Nor will any distinction be made between still or motion pictures, since my invention is adaptable for projecting any of the aforementioned pictures by anyone skilled in the art.

The problem of using conventional size projector lens for each of the adjacent frames was solved by displacing the axis of the light passing through the images to the required distance by interposing an image channel or other reflecting means for each of said frames. To bring the displaced images into register, each lens is mounted slidably toward their common center.

In its simplest form, this invention is employed in the additive color projection and in the more sophisticated form, in color television.

It was learned that the proper combination of these simple rules, will recreate the original colors of the object when only two of the primary colors, the red and the green are used. The feasibility of the system was demonstrated at the conference of the Society of Photographic Scientists and Engineers in Cleveland, Ohio, May 19–21, 1965. Later the complete paper was published in the Industrial Photography September 1965 issue. As a conclusion, only for the most discriminate purpose is the third color the blue required.

The present invention does not relate to the mechanical details of any projector, and no detailed description of the mechanism need be given, it being understood by those skilled in the art that any existing movement may be uitlized.

Summarizing this system; the film it uses is exposed according to the well known Urban-Smith process, consisting of alternate color separation transparencies. It comprises—in addition to the components of a conventional projector—an enlarged film gate for the simultaneous illumination of multiple frames, one image channel, one color filter, and one conventional lens for each of said projected frames. For still projection the filters are stationary, while for motion pictures they are synchronized with the frames, through which they were originally exposed. In either case only one of the projector lens produces sharp image, and the other or others are the diffuser type, projecting only soft fill in colors.

The invention now will be fully explained by describing certain specific embodiments thereof with reference to the drawing.

FIG. 1 shows the components for two color projection in schematic in their relative position. FIG. 2 shows the same in the next frequency. The film generally at 1 shows the alternate red and green exposed frames 2 and 3 respectively, the enlarged film gate 12, the sharp lens 4, the diffuser lens 5, the set of color filters generally at 6—illustrated as a color wheel—the red filter section 7, the green filter section 8, the transposed red image 2A, and the transposed green image 3A.

FIG. 3 shows the section 1—1, and FIG. 4 is the section 2—2 of FIG. 1, through the image channels 9 and 10—illustrated in their simplest form as rhomboidal prisms, hereafter called prism and the screen 11.

Figure 5:
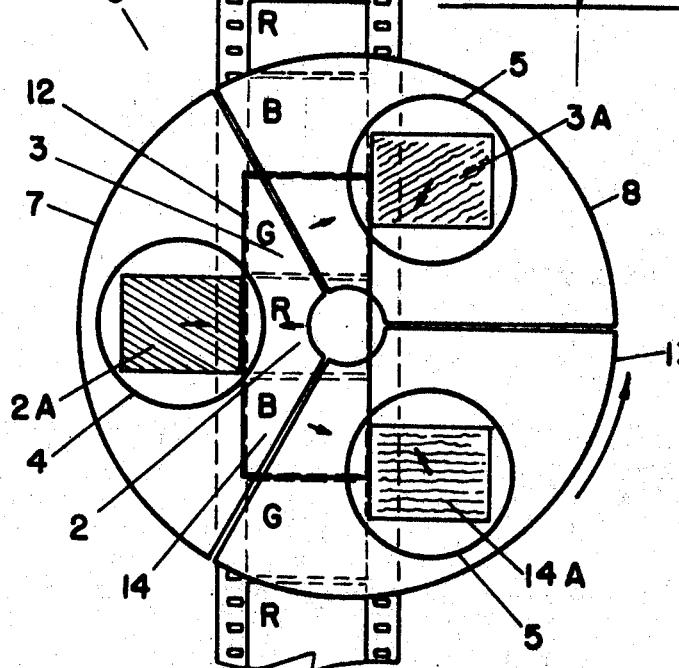

FIG. 5 is the arrangement of the components of the critical color reproduction with three colors. Here the designated numerals are the same for the corresponding components, as in FIGS. 1 and 2, with the blue filter exposed from 14, the transposed blue image 14A and the blue color filter section 13 being added.

In operation with two colors, a single frequency is shown in FIG. 1, in which the red exposed frame 2 is at the upper part of the film gate 12. The light passing through this frame shown in as section 1—1 in FIG. 3, as it is transposed within the prism 9, then through the red filter section 7, enters into the sharp lens 4, which directs it toward the center of the screen 11. Simultaneously, in the same frequency the green exposed frame is at the lower part of the film gate 12, and the light passing through this frame is shown in section 2—2 in FIG. 4, as it is transposed within the prism 10, then through the green filter section 8 enters into the diffuser lens 5, which directs it toward the center of the screen 11 in register with the red frame 2 projected sharp image, producing a composite color picture.

FIG. 2 shows the next frequency. The color filter 6 rotated a ½ revolution, a new green exposed frame 3 is moved to the upper part of film gate 12, the light passing through it follows the same route as the light through the red exposed frame in the previous frequency, but having the green filter section 8 in its path, producing a green color sharp image on the screen 11. The red exposed frame 2 is at the lower part of the film gate 12, the light passing through follows the same route as the light through the green exposed frame in the previous frequency, but producing a red diffused image, superimposing the sharp green projection, blending into a full color picture.

In two color operation, each frame will be projected twice, once from each of the two different positions, alternately sharp and diffused. The color wheel 6 is moving synchronously to assure that each frame will be projected through the same color filter, through which it was originally exposed. The reason for the lens 5 to be the diffuser type is to project only soft color, without sharp contour onto the sharp projected image, to obliterate the time lag between the adjacent images.

In FIG. 5, I illustrate the arrangement of the components for three color projection. It is noted, that the film has a group of three color exposed frames, has three prisms transposing the axis of three lights passing through the linearly disposed film frames into the circularly arranged lenses, of which only one is sharp and the other two are the diffuser type. In the three color projection each frame will be projected three times, once from each of the three different positions and the center frame will always be projected through the sharp lens.

The lenses in the same group have identical focal lengths and are the same distance from the center of the frames and to the center of their own arrangement.

Although few modifications of my invention have been described for the purpose of clarification, it is understood that the invention is not to be limited to the exact modifications, as other variations will be apparent to those skilled in the art. Therefore the invention is to be limited only to the extent set forth in the appended claims.

Features disclosed but not claimed here are being claimed in my existing Patent No. 2,733,632 issued February 1956.

I claim:

1. A system of additive color projection comprising, adjacent multiple frames of color separation images, a projector lens means and corresponding color filter for each of said multiple frames, one lens means producing sharp images and the other, or others which are of the diffuser type, producing soft fill-in colors without sharp outline, and means for transposing the linearly disposed adjacent images into each of said lenses, whereby said multiple frames are simultaneously projected.

References Cited

UNITED STATES PATENTS

| | | | |
|---|---|---|---|
| 973,962 | 10/1910 | Oliver | 353—31 |
| 2,384,319 | 9/1945 | Lebus | 353—31 |
| 3,352,200 | 11/1967 | Berger | 88—24 |

NORTON ANSHER, Primary Examiner

R. A. WINTERCORN, Assistant Examiner

U.S. Cl. X.R.

352—67